United States Patent Office 3,317,464
Patented May 2, 1967

3,317,464
PRODUCTION OF LINEAR AROMATIC
POLYESTERS
Andre Jan Conix, Antwerp, Belgium, assignor to Gevaert
Photo-Producten N.V., Mortsel-Antwerp, Belgium, a
Belgian company
No Drawing. Filed June 10, 1963, Ser. No. 286,496
Claims priority, application Great Britain, Dec. 14, 1956,
38,306/56
4 Claims. (Cl. 260—47)

This invention relates to the production of polymeric materials and particularly of linear aromatic polyesters the present application being a continuation-in-part of the co-pending application, Ser. No. 702,252, filed Dec. 12, 1957, now abandoned.

It is known to prepare aromatic polyesters by causing terephthalic acid or ester-forming derivatives to react with aliphatic glycols having from 2 to 12 carbon atoms. The most valuable representative of the series of polyesters thus obtained is polyethylene terephthalate.

This polyester, which is insoluble in low boiling organic solvents, is generally transformed by extrusion from the melt into good fibres and films. In order to obtain useful properties, these fibres and films have to be stretched several times their original length.

It has also been proposed to produce aromatic polyesters by substituting diphenols for glycols in reactions with dicarboxylic acids, but it was found difficult or impossible to obtain polyesters having sufficiently high molecular weights when the free diphenol was used as the starting material. Products of high molecular weight can be obtained, however, according to British patent specification No. 621,102, corresponding to U.S. patent specification No. 2,595,343, by condensing the dicarboxylic acid with the diacetate of the diphenol or by reacting the dicarboxylic acid with the diphenol in the presence of acetic anhydride.

However, the products prepared according to the above procedure from diphenols, such as hydroquinone and aliphatic acids are crystalline in nature and insoluble in low boiling organic solvents. Hence, they have to be worked up from the melt and the fibres and films so fabricated have to be drawn to attain useful properties such as flexibility.

It is therefore, an object of the present invention to provide new linear aromatic polyesters which are soluble in low boiling solvents such as chlorinated hydrocarbons, have high softening temperatures and do not have any tendency to crystallize.

A further object of the invention is to provide new linear aromatic polyesters, of high molecular weight having an intrinsic viscosity of at least 0.4 dl./g. when measured in 1,2-dichloroethane or sym-tetrachloroethane at 25° C.

Still further objects will appear from the following description and claims.

The polyesters according to the invention are obtained by polycondensation of diphenols with aromatic dicarboxylic acids according to a process characterized by the selection of diphenols of the general formula:

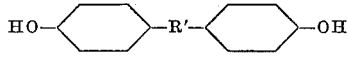

or chemically equivalent derivatives thereof, such as diacetates and other diesters, and aromatic dicarboxylic acids of the general formula:

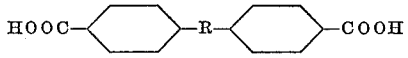

or chemically equivalent derivatives thereof, such as esters or anhydrides, and wherein at least R and R' is an alkyl- or aryl-substituted methylene group. The remaining R or R' can be an ether (—O—), carbonyl (—CO—) or an alkyl- or aryl- substituted methylene group.

Illustrative non-fused, polynuclear aromatic acids are:
4,4'-dicarboxy-diphenyl ether,
4,4'-dicarboxy-benzophenone,
1,1-(4,4'-dicarboxy-diphenyl) ethane,
2,2-(4,4'-dicarboxy-diphenyl) propane,
2,2-(4,4'-dicarboxy-diphenyl) 1,1-dimethylpropane,
3,3-(4,4'-dicarboxy-diphenyl) heptane,
1,1-(4,4'-dicarboxy-diphenyl) propane,
1,1- or 2,2-(4,4'-dicarboxy-diphenyl) butane and
1,1- or 2,2-(4,4'-dicarboxy-diphenyl) pentane.

Illustrative non-fused, polynuclear diphenols are:
2,2-(4,4'-dihydroxy-diphenyl) propane,
2,2-(4,4'-dihydroxy-diphenyl) 1,1-dimethylpropane,
3,3-(4,4'-dihydroxy-diphenyl) heptane,
1,1-(4,4'-dihydroxy-diphenyl) propane,
1,1- or 2,2-(4,4'-dihydroxy-diphenyl) butane,
1,1- or 1,2-(4,4'-dihydroxy-diphenyl) pentane,
1,1-diphenyl, 1,1-(4,4'-dihydroxy-diphenyl) methane and
1-phenyl, 1,1-(4,4'-dihydroxy-diphenyl) methane.

The invention includes polyesters obtained by reacting a mixture of two or more of the specified diphenols with one or more of the specified dicarboxylic diphenylic acids or mixture of two or more of these acids with one or more of the said diphenols.

The polyesters according to the invention contain the recurring structural units according to the general formula:

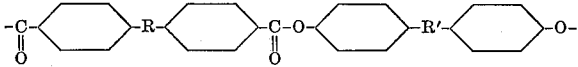

wherein R and R' represent radicals as defined above. As is apparent, each unit must necessarily contain a substituted methylene unit. Thus, at least R or R' is a substituted methylene radical, having the structure

wherein $R_2$ is hydrogen, alkyl or phenyl and $R_3$ is alkyl or phenyl. Taking into account the availability of the starting materials on a commercial scale, these polyesters comprising an alkyl substituted methylene radical are the most interesting wherein the alkyl group is a lower alkyl group. "Lower alkyl" as employed herein, embraces radicals having from 1 to 6 carbon atoms in a carbon-to-carbon-chain.

Hereinafter follow some examples of such substituted methylene groups:

| —CH— | —CH— | —CH— | —CH— |
|---|---|---|---|
| $CH_3$ | $CH_2$ | $(CH_2)_2$ | $(CH_2)_3$ |
|  | $CH_3$ | $CH_3$ | $CH_3$ |

| $CH_3$ | $CH_3$ | $CH_3$ | $CH_3$ |
|---|---|---|---|
| —C— | —C— | —C— | —C— |
| $CH_3$ | $CH_2$ | $(CH_2)_2$ | $(CH_2)_3$ |
|  | $CH_3$ | $CH_3$ | $CH_3$ |

| $H_3C$ $CH_3$ | $CH_3$ | | |
|---|---|---|---|
| $CH$ | $(CH_2)_3$ | —CH— | $C_6H_5$ |
| —C— | —C— | $C_6H_5$ | —C— |
| $CH_3$ | $CH_2$ | | $C_6H_5$ |
|  | $CH_3$ | | |

The polycondensation occurs by heating the dicarboxylic acid and the diphenol according to known methods, preferably with the aromatic diphenols in the form of a diacetate or in the presence of acetic anhydride.

Ordinarily, the reaction is carried out in a molten mixture of reagents and reaction products, but it can also be done in solution, for instance, in inert solvents such as alpha-methyl-naphthalene, diphenyl or diphenyl oxide.

The reaction conditions are preferably chosen in such a way that high molecular products are obtained.

It is a special aspect of the present invention that the new aromatic polyesters with high-molecular weight are soluble in chlorinated hydrocarbons such as methylene chloride, chloroform, dichloroethane, tetrachloroethane, etc. From these solutions, films can be cast which are transparent, even when obtained after very slow evaporation of the solvent.

It is a special advantage of the invention that films prepared from polyesters of the invention, cast from chlorinated hydrocarbons or extruded from the melt need not be stretched and heat-set in order to give them useful properties. The unstretched films show good mechanical properties and are especially flexible. Moreover, the films show low water absorption and, consequently, a high dimensional stability against changes in humidity. Furthermore, they possess excellent thermal dimensional stability so that even after protracted storage of the film at temperatures of 150° C., their good mechanical properties remain unaltered. These properties make these films suitable for use as film supports for light-sensitive emulsions, especially for materials which require a great dimensional stability.

Owing to the fact that the polyesters of the invention are thermoplastic, they can be worked up from the melt into useful shaped forms by applying fabrication techniques known in the art such as pressing, molding or vacuum-forming. The so-formed objects are characterized by a high thermal dimensional stability against changes in temperature and humidity. Similarly, the polyesters can be transformed out of the melt or from solutions into fibres showing good textile properties.

Examples 1–9 illustrate the invention without limiting, however, the scope thereof. The softening points are obtained on films prepared from the polyesters. The elongation of strips of films subjected to a load of 0.17 kg./sq. mm. is measured as a function of the temperature. The temperature where a large rise in elongation is observed, is taken as the softening temperature. It is to be emphasized that these temperatures have only a comparative value and are not to be compared with melting temperatures. In fact, they correspond more or less with glass transition temperature.

*Example 1*

22.4 g. of 2,2-bis-(4,4'-dicarboxy-diphenyl) propane and 24.55 g. of 2,2-bis(4,4'-diacetyloxy-diphenyl) propane are heated together in the presence of 10 mg. of p-toluene sulphonic acid and 15 mg. of antimonytrioxide at a temperature of 305° C. As soon as the reagents are melted, a slow stream of nitrogen is bubbled through the reaction mass and acetic acid is slowly distilled over. After about 30 minutes reaction time, heating is continued under a sub-atmospheric pressure of about 0.1 mm. of Hg. The reaction mass becomes more and more viscous until after about 3 hours, no apparent change in melt viscosity can be observed. Upon cooling, a hard, tough and transparent material is obtained which shows a softening point of about 230° C. The polymer is soluble in cold methylenechloride, 1,2-dichloroethane, chloroform and sym-tetrachloroethane. The intrinsic viscosity of the polymer measured in 1,2-dichloroethane solution is 0.4 dl./g.

A 20% solution of the polymer in 1,2-dichloroethane is made and cast to give a very transparent and glossy film which is characterized by a low water-absorption (less than 0.5%) and an especially high softening point. The film can be held at a temperature of 160° C. for prolonged periods without showing any apparent sign of deterioration or loss in mechanical properties. Only when heating the film at a temperature of 260° C. does it become sticky.

*Example 2*

5.165 g. of di-p-carboxydiphenylether and 6.873 g. of 2,2-(4,4'-diacetoxy-phenyl) propane are heated together at 305° C. in the presence of 0.4 cm.$^3$ of a 0.5% solution of butylorthotitanate in acetice acid. A continuous stream of dry nitrogen is bubbled through the reaction mass. After 1 hour heating, the system is evacuated and heating is continued for 5 hours under vacuo.

Upon cooling, a tough transparent solid is obtained, showing a softening point of about 220° C. and an intrinsic viscosity measured in 1,2-dichloroethane solution of 0.86 dl./g. The polymer is soluble in methylenechloride, chloroform 1,2-dichloroethane, dioxane, tetrahydrofuran and sym-tetrachloroethane. From solutions in any of these solvents transparent and tough films can be cast. The water-absorption of these films, measured after 24 hours immersion in water amounts to 0.35%. The films showed a tensile strength of 6.1 kg./sq. mm., a yield point of 5.4 kg./sq. mm., an elongation at break of 61% and a Young's modulus of 200 kg./sq. mm.

The unstretched films showed an exceptional dimensional stability. On storing unsupported films at 140° C. no shrinkage could be observed, at 160° C. the shrinkage amounted to only 1% of the original dimensions. These properties make these films exceptionally valuable as a base for photographic films.

*Example 3*

2.84 g. of 2,2-bis-(4,4'-dicarboxy-diphenyl) propane and 3.68 g. of 1-phenyl-1,1-bis-(4,4'-diacetyloxy-diphenyl) methane are heated together in the presence of 0.2 cm.$^3$ of a 0.5% solution of butylorthotitanate in acetice acid. The temperature is held at 305° C., while a slow stream of nitrogen is bubbled through the reaction mass and acetic acid distilled over. After heating for about 30 minutes, the apparatus is evacuated and heating continued for 5 hours under vacuo. Upon cooling, a hard and tough material is obtained, soluble in methylene chloride, 1,2-dichloroethane and tetrachloroethane. The polymer has a softening point of 218° C. Films cast out of solutions showed a tensile strength of 7.2 kg./sq. mm., an elongation of 8% and a Young's modulus of 204 kg./sq. mm. The intrinsic viscosity of the polymer measured in 1,2-dichloroethane is 0.50 dl./g.

*Example 4*

4.186 g. of the diphenylester of 4,4'-dicarboxydiphenyl ether and 2.283 g. of 2,2-(4,4'-dihydroxydiphenyl) propane are melted together at 282° C. in the presence of 2 mg. of butylorthotitanate while a slow stream of pure nitrogen is bubbled through the reaction mass. Phenol is immediately distilled over and the clear melt becomes slowly viscous. After 3 hours the apparatus is placed under vacuo. After about 15 minutes the pressure has decreased till 0.05 mm. of Hg. The condensation is continued for another 3 hours in the same circumstances. The melt is stirred continuously by bubbling through pure and dry nitrogen (5 p.p.m. of oxygen). Upon cooling the very viscous melt solidifies and a tough crystal-clear polymer is obtained, which is completely soluble in methylene chloride and in 1,2-dichloroethane. From these solutions films showing good mechanical properties can be cast. The intrinsic viscosity of the polymer measured in 1,2-dichloroethane is 0.58 dl./g.

*Example 5*

2.58 g. of 4,4'-dicarboxydiphenyloxide (0.01 mole) and 3.18 g. of 2,2-(4,4'-diacetyloxydiphenyl)-propane (0.0102 mole) are heated at 305° C. in the presence of 2 mg. of p-toluene-sulphonic acid and 5 mg. of antimonytrioxide. A slow stream of nitrogen is bubbled through the reaction mass and acetic acid is distilled over. After about 30 minutes reaction time, heating is continued under a pressure of about 0.1 mm. of mercury. The reaction mass becomes more and more viscous until after about 3 hours, no apparent change in melt viscosity can be observed. Upon cooling, a hard, tough and transparent material is obtained which shows a softening point of about 220° C. The polymer is soluble in 1,2-dichloroethane, chloroform and sym-tetrachloroethane. The intrinsic viscosity of the polymer measured in 1,2-dichloroethane is 0.86 dl./g.

A 20% solution of the polymer in dichloroethane is cast onto a glass plate and after evaporation of the solvent, a transparent and glossy film is obtained which is dried for 24 hours at 100° C. to eliminate all traces of solvent.

The water-absorption of these films, measured after 24 hours immersion in water, amounts to 0.35%. The films have the following properties:

| | |
|---|---|
| Yield point | kg./sq. mm__ 5.4 |
| Elongation at break | percent__ 61 |
| Tensile strength | kg./sq. mm__ 6.1 |
| Modulus of elasticity | kg./sq. mm__ 200 |

The unstretched film has an exceptional dimensional stability. When storing the film at 140° C., no shrinkage could be observed, at 160° C., the shrinkage amounts to only 1% of the original dimensions.

*Example 6*

5.16 g. of 4,4'-dicarboxydiphenyloxide (0.02 mole) and 7.34 g. of 4,4'-diacetyloxydiphenylphenylmethane (0.0204 mole) are heated in the presence of 2 mg. of p-toluene sulphonic acid and 5 mg. of antimonytrioxide at a temperature of 282° C. A slow stream of nitrogen is conducted through the reaction mass and acetic acid is distilled for about 1 hour. Heating is further continued in vacuo for about four hours. Upon cooling, it was a transparent solid with good solubility in methylene chloride, 1,2-dichloroethane, 1,1,2-trichloroethane, sym-tetrachloroethane, tetrahydrofurane and dioxane. The intrinsic viscosity measured in 1,2-dichloroethane solution is 0.56 dl./g. Transparent and flexible films with excellent mechanical properties were cast from a 20% solution in dichloroethane. The film showed a softening temperature of 190° C., a tensile strength of 6.3 kg./sq. mm., a modulus of elasticity of 200 kg./sq. mm. and an elongation at break of 20%.

*Example 7*

2.84 g. of 2,2-(4,4'-dicarboxydiphenyl)-propane (0.01 mole) and 3.33 g. of 2,2-(4,4'-diacetyloxydiphenyl)butane (0.0102 mole) are heated at 305° C. in the presence of 0.2 cm.³ of a 0.5% solution of butylorthotitanate in acetic acid. A slow stream of nitrogen is bubbled through the reaction mass and acetic acid is distilled for about one hour. Heating is further continued in vacuo for about four hours. The reaction product remained fluid and transparent during the entire reaction. Upon cooling, it was a transparent solid, having a softening point of 250° C. and being soluble in methylene chloride, 1,2-dichloroethane, 1,1,2-trichloroethane, sym-tetrachloroethane. The intrinsic viscosity measured in 1,2-dichloroethane solution is 0.56 dl./g. Transparent films with excellent mechanical properties were cast from a 20% solution in dichloroethane. These films have the following mechanical properties: a tensile strength of 5.9 kg./sq. mm., a yield point of 5.4 kg./sq. mm., a modulus of elasticity of 180 kg./sq. mm. and an elongation at break of 47%.

*Example 8*

5.16 g. of 4,4'-dicarboxydiphenyloxide (0.02 mole) and 6.93 g. of 3,3'-(4,4'-diacetyloxydiphenyl)-pentane (0.0204 mole) are heated for one hour in the presence of 2 mg. of p-toluene sulphonic acid and 5 mg. of antimonytrioxide at a temperature of 282° C. A slow stream of nitrogen is bubbled through the reaction mass and acetic acid is distilled for about one hour. Thereafter, heating is continued under vacuum for four hours. The reaction product remained fluid and transparent during the entire reaction. Upon cooling, it was a transparent solid, having a softening point of 125° C., and being soluble in methylene chloride, benzene, toluene, tetrahydrofurane, dioxane, 1,2-dichloroethane and sym-tetrachloroethane. The intrinsic viscosity, measured in sym-tetrachloroethane solution is 0.82 dl./g. Transparent films with excellent mechanical properties were cast from a 20% solution in 1,2-dichloroethane. These films have the following mechanical properties: a tensile strength of 7.5 kg./sq. mm., a yield point of 6.2 kg./sq. mm., a modulus of elasticity of 182 kg./sq. mm. and an elongation at break of 65%.

*Example 9*

7.74 g. of 4,4'-dicarboxydiphenyloxide (0.03 mole) and 11.69 g. of 2,2-(4,4'-diacetyloxydiphenyl)-octane (0.0306 mole) are heated for one hour in the presence of 3 mg. p-toluene sulphonic acid and 6 mg. antimonytrioxide at a temperature of 282° C. A slow stream of nitrogen is bubbled through the reaction mass and acetic acid is distilled for about one hour. Thereafter, heating is continued under vacuum for four hours. The reaction product remained fluid and transparent during the entire reaction. Upon cooling, it was a transparent solid, being soluble in methylene chloride, 1,2-dichloroethane, 1,1,2-trichloroethane, sym-tetrachloroethane. The intrinsic viscosity, measured in sym-tetrachloroethane solution, is 0.72 dl./g. Transparent films with excellent mechanical properties were cast from a 20% solution in 1,2-dichloroethane. These films have the following mechanical properties: a softening temperature of 120° C., a modulus of elasticity of 176 kg./sq. mm., a tensile strength of 6.6 kg./sq. mm., a yield strength of 5.9 kg./sq. mm. and an elongation at break of 24%.

As is apparent, the polyesters prepared according to the above examples possess highly advantageous properties in that they are soluble in most organic solvents, will form self-sustaining films and possess high softening points. On the other hand, polyesters prepared from phenols and aromatic dicarboxylic acids which do not contain a substituted methylene group in the molecule are infusible below temperatures of about 300° C., are crystalline, and are insoluble in the common organic solvents. Therefore, it is impossible to obtain films of the materials employing conventional casting and pressure molding techniques. Examples 10 and 11 illustrate such prior art polymers.

*Example 10*

2.58 g. of 4,4'-dicarboxydiphenyloxide (0.01 mole) and 3.04 g. of 4,4'-diacetyloxybenzophenone (0.0102 mole) are heated at 305° C. in the presence of 0.2 cm.³ of a 0.5% solution of butylorthotitanate in acetic acid. A slow stream of nitrogen is bubbled through the reaction mass and acetic acid is distilled for about one hour. Heating is further continued in vacuo for about four hours. The obtained hard, brown polymer is infusible below 300° C. and insoluble in the common organic solvents, such as methylenechloride, 1,2-dichloroethane, sym-tetrachloroethane, tetrahydrofurane, benzene, nitrobenzene and dimethylformamide. The product is even insoluble in such polar solvents as m-cresol, pyridine and in the mixture 60/40 phenol/sym-tetrachloroethane. Therefore, no film could be obtained by the conventional casting or pressure molding techniques.

*Example 11*

2.58 g. of 4,4'-dicarboxydiphenyloxide (0.01 mole) and 2.90 g. of 4,4'-diacetyloxydiphenylmethane (0.0102 mole) are heated in the presence of 3 mg. of p-toluene sulphonic acid and 5 mg. of antimonytrioxide at a temperature of 305° C. A slow stream of nitrogen is bubbled through the reaction mass and acetic acid is distilled for about one hour. Heating is further continued in vacuo for about four hours. The obtained hard, brown polymer is infusible below 300° C. and insoluble in the common organic solvents, such as methylenechloride, 1,2-dichloroethane, sym-tetrachloroethane, tetrahydrofurane, benzene, nitrobenzene and dimethylformamide. The product is even insoluble in such polar solvents as m-cresol and pyridine.

Therefore, no film could be obtained by the conventional casting or pressure molding techniques.

I claim:

1. A highly polymeric, linear polyester soluble in chlorinated hydrocarbons and having an intrinsic viscosity of at least 0.4 dl./g. when measured in a solvent taken from the group consisting of 1,2-dichloroethane and sym-tetrachloroethane at 25° C., of a non-fused, polynuclear phenol and a non-fused, polynuclear aromatic dicarboxylic acid, consisting essentially of re-occurring units of the formula:

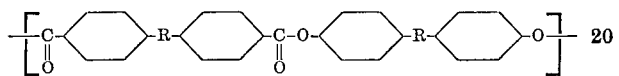

wherein R is propylidene.

2. A self-sustaining film of the polyester of claim 1.
3. A flexible fibre of the polyester of claim 1.

4. A highly polymeric, linear polyester soluble in chlorinated hydrocarbons and having an intrinsic viscosity of at least 0.4 dl./g. when measured in a solvent taken from the group consisting of 1,2-dichloroethane and sym-tetrachloroethane at 25° C., consisting essentially of re-occurring units of the formula:

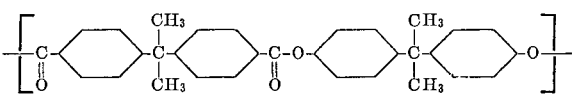

References Cited by the Examiner

UNITED STATES PATENTS

| | | | |
|---|---|---|---|
| 2,595,343 | 5/1952 | Drewitt et al. | 260—47 |
| 2,799,666 | 7/1957 | Cladwell | 260—47 |
| 2,807,606 | 9/1957 | Lincoln | 260—47 |
| 3,028,364 | 4/1962 | Conix et al. | 260—47 |

FOREIGN PATENTS 651,762  4/1951  Great Britain.

WILLIAM H. SHORT, *Primary Examiner.*

L. P. QUAST, *Assistant Examiner.*